(12) United States Patent
MacKenzie et al.

(10) Patent No.: US 7,927,394 B2
(45) Date of Patent: Apr. 19, 2011

(54) APPARATUS AND METHOD FOR ENHANCED DROPLET COLLECTION IN GAS FLOWS

(75) Inventors: Douglas MacKenzie, Airdrie (CA); Arnold Toews, Calgary (CA)

(73) Assignee: Gas Liquids Engineering Ltd., Calgary (CA)

( * ) Notice: Subject to any disclaimer, the term of this patent is extended or adjusted under 35 U.S.C. 154(b) by 1266 days.

(21) Appl. No.: 11/421,401

(22) Filed: May 31, 2006

(65) Prior Publication Data

US 2007/0277485 A1 Dec. 6, 2007

(51) Int. Cl.
 *B01D 46/00* (2006.01)
(52) U.S. Cl. ............... 55/392; 55/477; 55/482; 55/485; 55/423
(58) Field of Classification Search ............ 55/424, 55/485–505, 477, 392, 482, 423; 95/287
 See application file for complete search history.

(56) References Cited

U.S. PATENT DOCUMENTS

| | | | | |
|---|---|---|---|---|
| 741,210 | A | * | 10/1903 | Young ............... 55/477 |
| 3,869,266 | A | * | 3/1975 | Rannenberg ......... 55/309 |
| 3,890,123 | A | * | 6/1975 | Kuga ............... 55/318 |
| 3,997,303 | A | | 12/1976 | Newton |
| 4,050,237 | A | | 9/1977 | Pal et al. |
| 4,124,360 | A | | 11/1978 | Berger, Jr. et al. |
| 4,167,482 | A | * | 9/1979 | Muller ............... 210/791 |
| 4,249,778 | A | | 2/1981 | McGuire |
| 4,249,918 | A | * | 2/1981 | Argo et al. ......... 95/273 |
| 4,443,233 | A | | 4/1984 | Moran |
| 4,548,262 | A | | 10/1985 | Hull |
| 4,564,377 | A | * | 1/1986 | Kocatas ............ 55/488 |
| 4,759,782 | A | * | 7/1988 | Miller et al. ........ 55/487 |
| 4,872,890 | A | | 10/1989 | Lamprecht et al. |
| 4,915,714 | A | * | 4/1990 | Teague et al. ......... 55/486 |
| 5,085,766 | A | * | 2/1992 | Born ............... 210/150 |
| 5,131,387 | A | | 7/1992 | French et al. |
| 5,605,748 | A | * | 2/1997 | Kennedy et al. ...... 55/486 |
| 5,961,678 | A | * | 10/1999 | Pruette et al. ....... 55/485 |
| 5,985,004 | A | | 11/1999 | Boyd |
| 6,071,419 | A | | 6/2000 | Beier et al. |

(Continued)

FOREIGN PATENT DOCUMENTS

JP 62093081 10/1988

OTHER PUBLICATIONS

Goodloe Structural Packing; Koch-Glitsch LP; www.koch-ottoyork.com/products/goodloe.htm; accessed Feb. 16, 2006.

(Continued)

*Primary Examiner* — Duane Smith
*Assistant Examiner* — Ives Wu
(74) *Attorney, Agent, or Firm* — Sean W. Goodwin; Linda M. Thompson

(57) ABSTRACT

Collection apparatus are installed in a horizontal separator vessel to aid conventional coalescing media to remove mist and droplets from a gas flow, typically downstream from a compressor. The collection apparatus have filaments which act to wick the coalesced droplets either from the conventional coalescing media or from the sides of the vessel toward an annular channel which collects the droplets and assists in delivering the droplets, by gravity, to the bottom of horizontal vessel where they are carried to a collection area. Use of the collection apparatus permits a reduction in the size of the separator vessel and further permits vapor load factors of up to about 10 times that in a conventionally designed separator vessel.

32 Claims, 7 Drawing Sheets

U.S. PATENT DOCUMENTS

| | | | |
|---|---|---|---|
| 6,136,076 | A | 10/2000 | Read |
| 6,149,408 | A | 11/2000 | Holt |
| 6,322,604 | B1 | 11/2001 | Midkiff |
| 6,409,805 | B1 | 6/2002 | Beier et al. |
| 6,419,721 | B1 | 7/2002 | Hunter |
| 6,432,179 | B1 * | 8/2002 | Lobovsky et al. ............ 96/296 |
| 6,770,121 | B1 | 8/2004 | Sindel |
| 6,858,057 | B2 | 2/2005 | Healey |
| 6,869,462 | B2 | 3/2005 | TeGrotenhuis et al. |
| 6,893,562 | B2 | 5/2005 | Busnach et al. |
| 7,182,804 | B2 * | 2/2007 | Gieseke et al. ............. 95/287 |
| 7,198,718 | B1 * | 4/2007 | Turnbull .................. 210/232 |

OTHER PUBLICATIONS

DEMISTER MIST Eliminators; Koch-Glitsch LP; www.koch-ottoyork.com/products/DEMISTER.htm; accessed Feb. 16, 2006.

Structured and Gauze Packing; Koch-Glitsch; www.koch-glitsch.com/koch/products/structured_packing.asp; accessed Jun. 14, 2005.

TEX-MESH Technical Bulletin 105; AMISTCO; www.amistco.com/spanish/tech105.htm; accessed June. 14, 2005.

Mist Collection Mechanisms; MECS; www.mecsglobal.com/MECS/layout/Products/Brinks/CollectMech/collectmech.asp; accessed Feb. 16, 2006.

Efficient gas scrubbing minimizes pressure drop; Porta-Test Whirlyscrub I(TM) Inline Recycling Separator; NATCOGROUP; www.natcogroup.com/Content.asp?t=Productpage&ProductID=31; Issue 7; Jul. 2002.

Horizontal Separators Configured to Meet Your Production Needs; Horizontal Longitudinal Flow Separator (HLF); NATCOGROUP; www.natcogroup.com/PDFcontent/phase-separation/horizontal-longitudinal-flow-separator-(HLF).pdf; Issue 7, Jul. 2002.

Lube Oil Scrubbers; Gequip; www.gequip.ca.

Fiberbeds 101 What they are . . . ; www.mecsglobal.com/MECS/imagees/brochures/MistEliminator/Fiberbeds101WhatTheyAre.pdf.

"Improved coalescing filter design utilizing a multi-component media approach"; Steven A Ziebold; Monsanto Enviro-Chem Systems Inc.; www.mecsglobal.com/MECS/images/brochures/Brinks/ImprovedCoalescingFilterDesignUtilizingAMultiComponentMediaApproach.pdf.

"Clearing up common misconceptions regarding mist eliminators"; Steven A Ziebold; Monsanto Enviro-Chem Systems Inc.; www.mecsglobal.com/MECS/images/brochures/Brinks/ClearingUpCommonMisconceptionsRegardingMistEliminators.pdf.

Brink Mesh Pads; Gas Cleaning; Mist Eliminators; www.envirochem.com/airpol/common/brinkmesh.html; accessed Jun. 14, 2005.

* cited by examiner

US 7,927,394 B2

APPARATUS AND METHOD FOR ENHANCED DROPLET COLLECTION IN GAS FLOWS

FIELD OF THE INVENTION

Embodiments of the invention relate to mist eliminators for coalescing fluid droplets from a vapor stream and more particularly to mist eliminators positioned in a horizontal vapor flow.

BACKGROUND OF THE INVENTION

It is well known to use coalescing media, such as knitted wire mesh pads and the like, for mist elimination to coalesce small droplets of fluid which are entrained in a vapor flow. The coalescing media acts to collect liquid particles on the fibers and to coalesce the droplets into liquid films and large droplets which can then move through the coalescing media under the drag force of the gas and downward by capillary action and gravity through the coalescing media. Typically, the coalesced collected liquid drains off the downstream face of the coalescing media to a collection zone.

It is known to position a separation vessel downstream of a gas compressor to remove lubricating oil mists and droplets which have become entrained in the high pressure flow of gas leaving the compressor.

Separation vessels are typically either vertical or horizontal in orientation. In the case of vertical separation vessels, a gas flow velocity as calculated by the Souders-Brown equation $[V_{allowable\,ft/sec} = K(P_L - P_g)/P_g)^{1/2}]$ with a K of about 0.30 to about 0.35 feet/second is typically a maximum velocity to avoid flooding of mesh pad type coalescing media commonly used. As described in AMISTCO Technical Bulletin 105, www.amistco.com/spanish/tech105.htm, a calculated vapor load factor or "K" factor as defined by the Souders-Brown equation utilizes the K factor for determining the flux cross section area of a mist eliminator or knockout drum. In the case of horizontal gas flows, the K value may be increased to about 0.5 using conventional mesh pads before flooding occurs.

If, in the case of a horizontal gas flow, the gas flow velocity is increased beyond the typically accepted value of K=0.5, the droplets which collect on the downstream face of the coalescing media often become re-entrained in the gas flow negating the separation performed by the coalescing media. Thus, conventionally large horizontal vessels have been required to keep the flow velocity below that at which the droplets will not re-entrain in the gas flow.

Thus, there is a need for apparatus and systems for mist elimination that minimize the size of the vessel required so as to reduce costs and environmental impact and increase the efficiency of mist elimination in gas flows.

SUMMARY OF THE INVENTION

Collection apparatus according to embodiments disclosed herein permit a reduction in separator vessel size, used to remove mists and droplets from a gas flow, with velocities and vapor loads exceeding conventional K values by up to about 10 times conventional design.

In a broad aspect, collection apparatus for the prevention of re-entrainment of coalesced droplets in a horizontal gas flow adapted to be positioned downstream of one or more thicknesses of coalescing material in a vessel containing the horizontal gas flow, comprises: an annular channel adapted to be positioned adjacent an inner wall of the vessel; a plurality of filaments fluidly connected to the annular channel for engaging the coalesced droplets for directing the coalesced droplets to the annular channel; and a port adjacent a bottom of the annular channel for gravity draining the coalesced droplets in the annular channel to a liquid collection area.

A first embodiment of the collection apparatus further comprises a plurality of secondary channels spanning transversely across and intersecting with the annular channel, the plurality of transverse channels supporting at least the plurality of filaments therein, the secondary channels being fluidly connected to the annular channel. The first embodiment is designed to be mounted adjacent a downstream face of a conventional coalescing media, such as a demister pad. The filaments substantially contact the demister pad's downstream face or the coalesced droplets adhering thereto and act to wick the coalesced droplets into the annular channel for gravity drainage to the inner wall of the vessel where they are carried by the boundary flow to the collection area.

In a second embodiment of the collection apparatus the plurality of filaments are supported by the annular channel and further comprises: an inner layer of a perforated material sandwiching the plurality of filaments between the inner layer and the vessel's inner wall so as to permit passage of the gas flow therethrough and leaving the intercepted coalesced droplets fluidly engaged with the plurality of filaments for directing to the annular channel.

In another embodiment, the first and second embodiments are employed in series.

Preferably, the perforated material is a screen. Further, the second embodiment is preferably mounted in the vessel adjacent the collection area, the port extending adjacent to or into the collection area for discharge of the collected coalesced droplets therein. The collection apparatus is mounted between about 45 degrees and 90 degrees relative to the inner wall of the vessel, the port being located at a leading bottom edge of the collection apparatus extending toward the collection area.

DETAILED DESCRIPTION OF THE PREFERRED EMBODIMENTS

Figure 1:
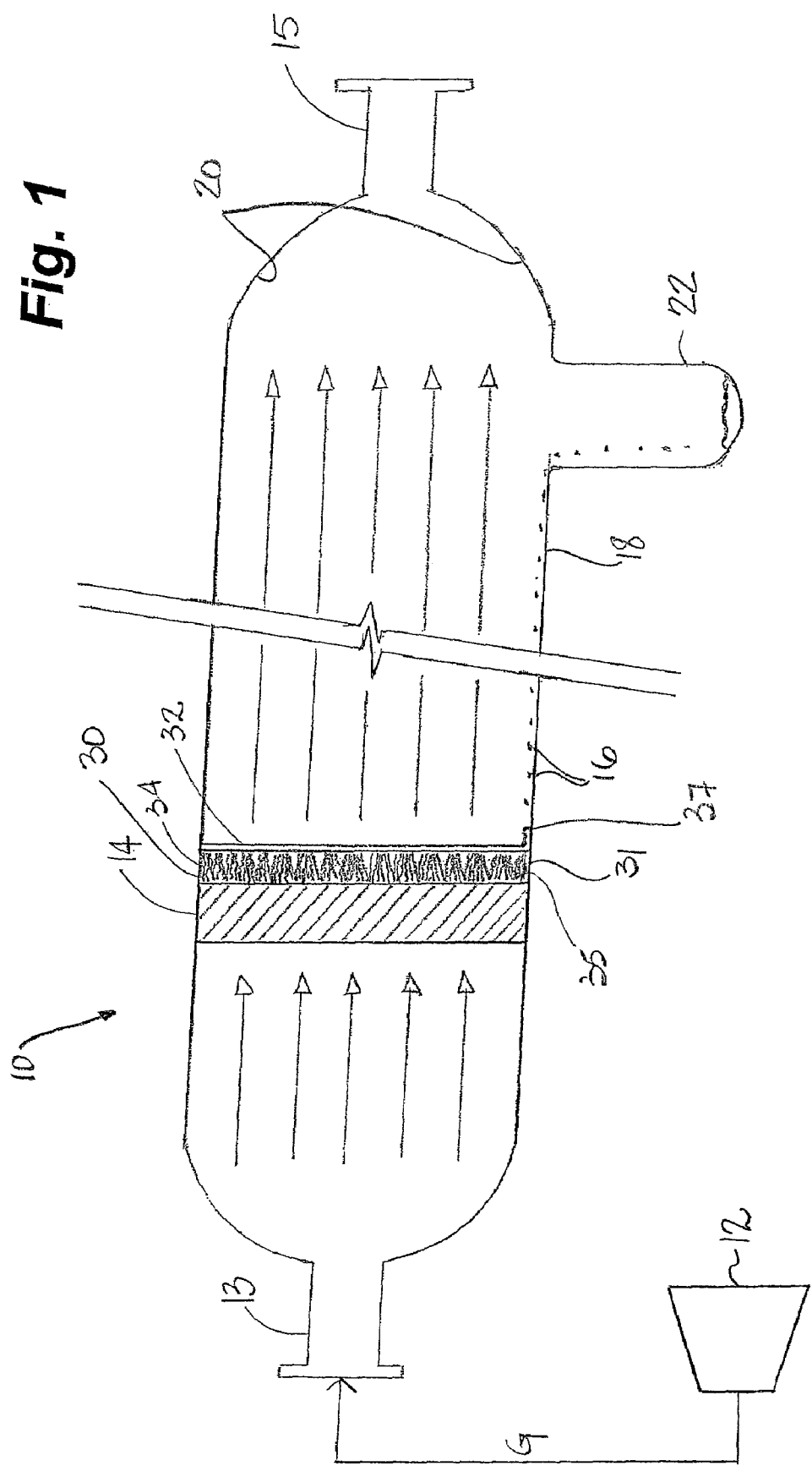
FIG. 1 is a longitudinal sectional view of a lube oil scrubber vessel having a collection apparatus according to an embodiment of the invention installed therein.

Having reference to FIGS. 1-4, a horizontal separation vessel 10, typically known as a lube oil scrubber, is connected downstream from a compressor 12 and receives a high pressure, high velocity gas flow G therefrom at an inlet 13 which contains entrained droplets and mists of lubricating oils and other such fluids used in the compressor 12, such as for lubrication. Conventional coalescing media or one or more demister pads 14 are positioned across a diameter of the vessel 10 to trap the entrained droplets and mist and cause the droplet size to increase such that the droplets become larger and heavier and are separated from the gas flow which exits the vessel 10 at an outlet 15. Typically, the coalesced droplets 16 move diagonally by gravity toward a bottom 18 of an inner wall 20 of the vessel 10 and flow therealong in the boundary flow of the gas flow G to a collection area 22. Coalesced droplets 16 which do not move to the bottom wall 18 are carried along the inner wall 20 of the vessel 10 and may gradually move downward due to gravity or the droplets 16 are at risk to be re-entrained in the high velocity gas flow G in the vessel 10.

Collection apparatus 30 are installed in the vessel 10 downstream from the demister pads 14 to collect the coalesced droplets 16 which are moving along the inner wall 20 of the vessel 10 and are directed through the collection apparatus toward the collection area 22.

Figure 5:
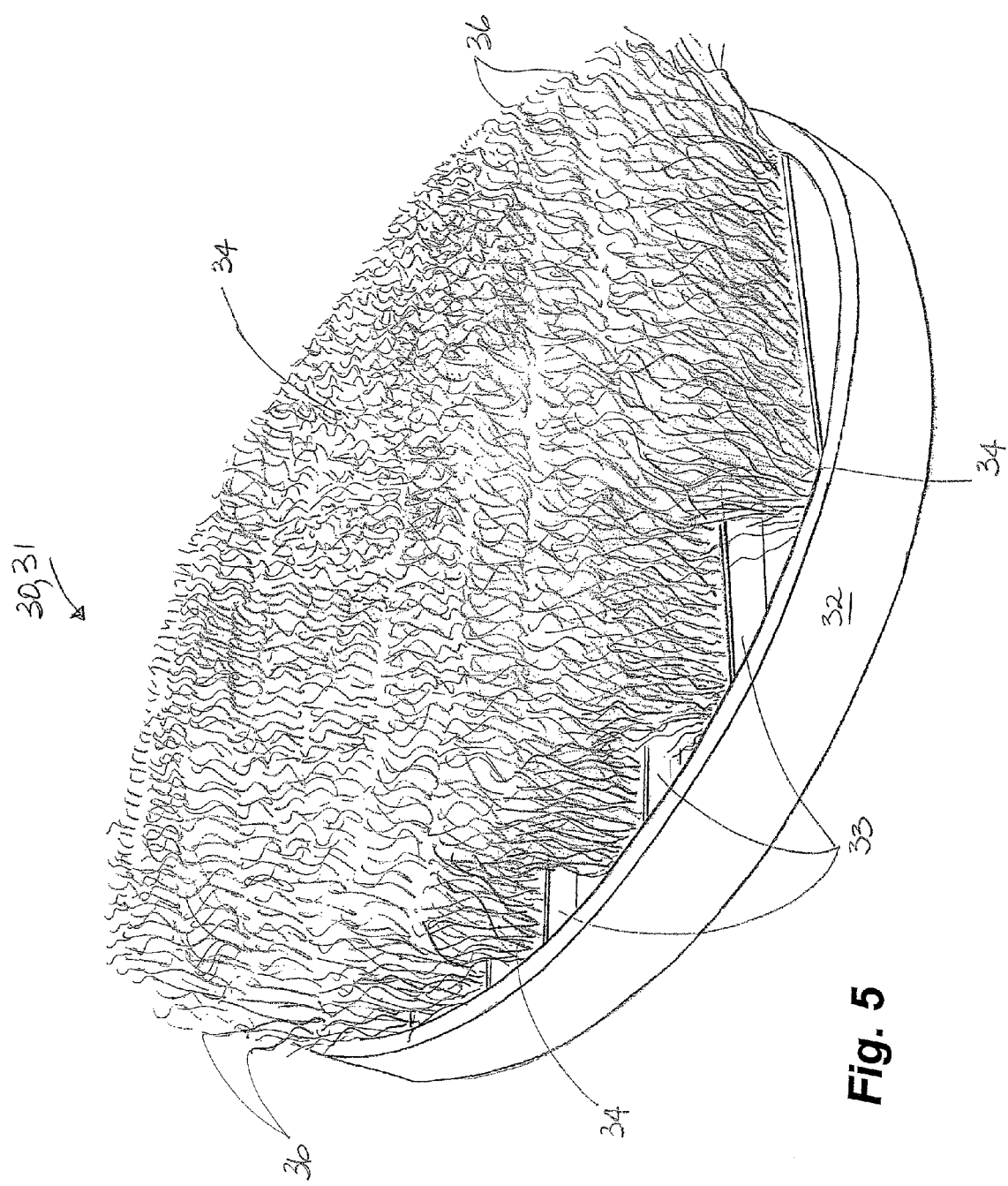
FIG. 5 is top perspective view of the collection apparatus of FIG. 1.
Figure 6:
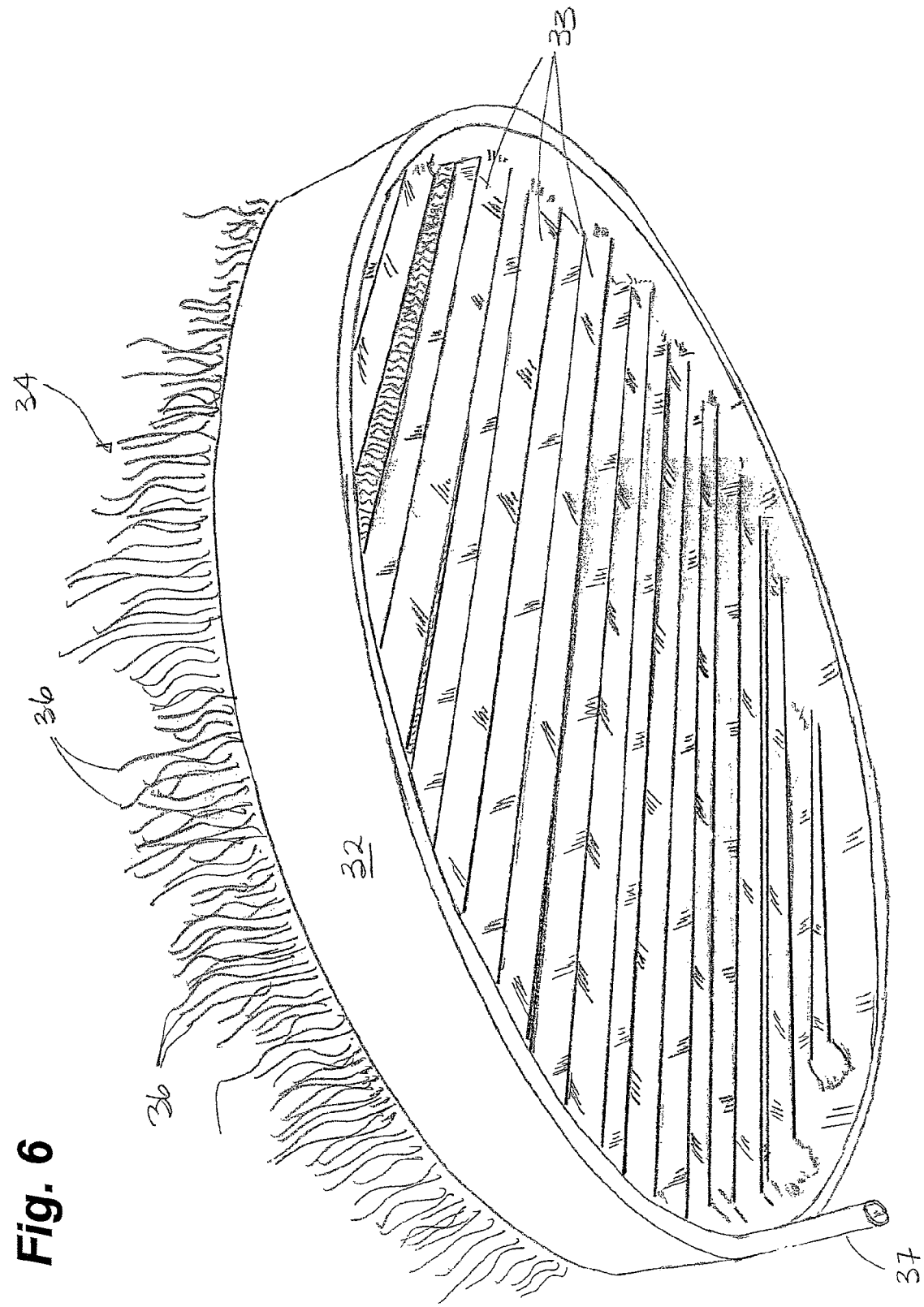
FIG. 6 is a bottom perspective view of the collection apparatus of FIG. 1.

As shown in FIGS. 1, 5 and 6, a first embodiment of the collection apparatus 30 comprises a transverse collector 31 having an annular channel 32 which is positioned adjacent the inner wall 20 of the vessel 10. A plurality of secondary channels 33 span across and intersect with the annular channel 32 to which the secondary channels 33 are fluidly connected. A plurality of filaments 34, typically wire filaments, are supported in the secondary channels 33 and extend outward therefrom away from the secondary channels 33 and the annular channel 32 to form an upstream face 39 of tips 36 of the filaments 34. The collection apparatus 31 is positioned adjacent a downstream face 35 of the demister pads 14 such that the upstream face 39 formed by the tips 36 substantially contacts the downstream face 35 of the demister pad 14 to receive coalesced droplets 16 collected thereon or contacts the coalesced droplets 16 only for receiving the coalesced droplets 16. The filaments 34 act to wick the coalesced droplets 16 from the downstream face 35 and direct the droplets along the filaments 34 to the secondary channels 33 and to the annular channel 32. A drainage port 37 is provided at a bottom 38 of the annular channel 32 so as to discharge the droplets along the bottom wall 18 of the vessel 10 where the droplets 16 are carried by the lower velocity boundary layer of the gas flow G to the collection area 22.

Preferably, the filaments 34 are retained in the secondary channels 33 such that the tips 36 of the filaments 34 are splayed outwards upstream so as to form the upstream face 39 of tips 36 to cover substantially the entire of the downstream face 35. The filaments 34 become more densely concentrated as the filaments 34 enter the secondary channels 33. The filaments 34 can form a conical shape with an apex at the secondary channels 33.

Figure 2:
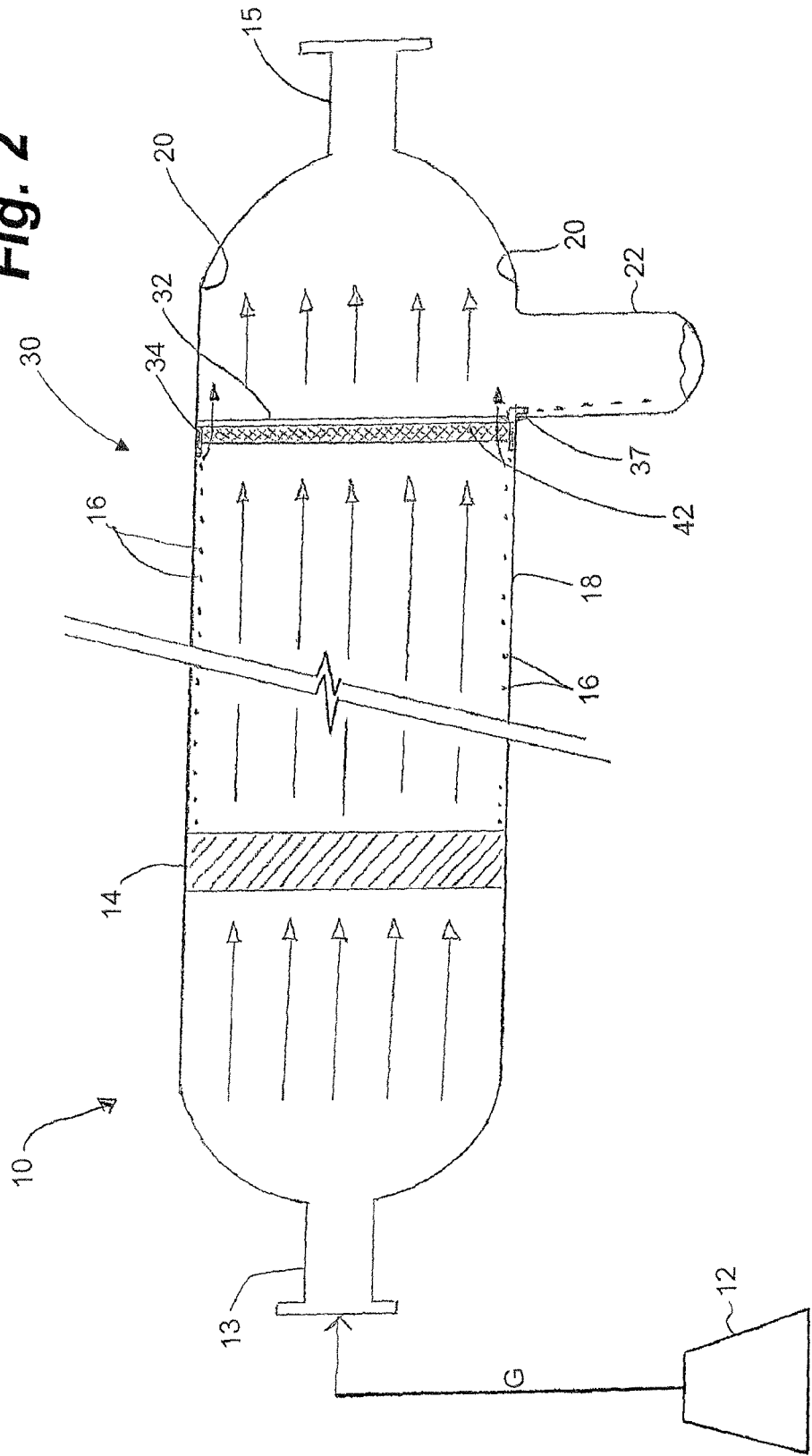
FIG. 2 is a longitudinal sectional view of a lube oil scrubber vessel having a collection apparatus according to another embodiment of the invention installed therein.
Figure 3:
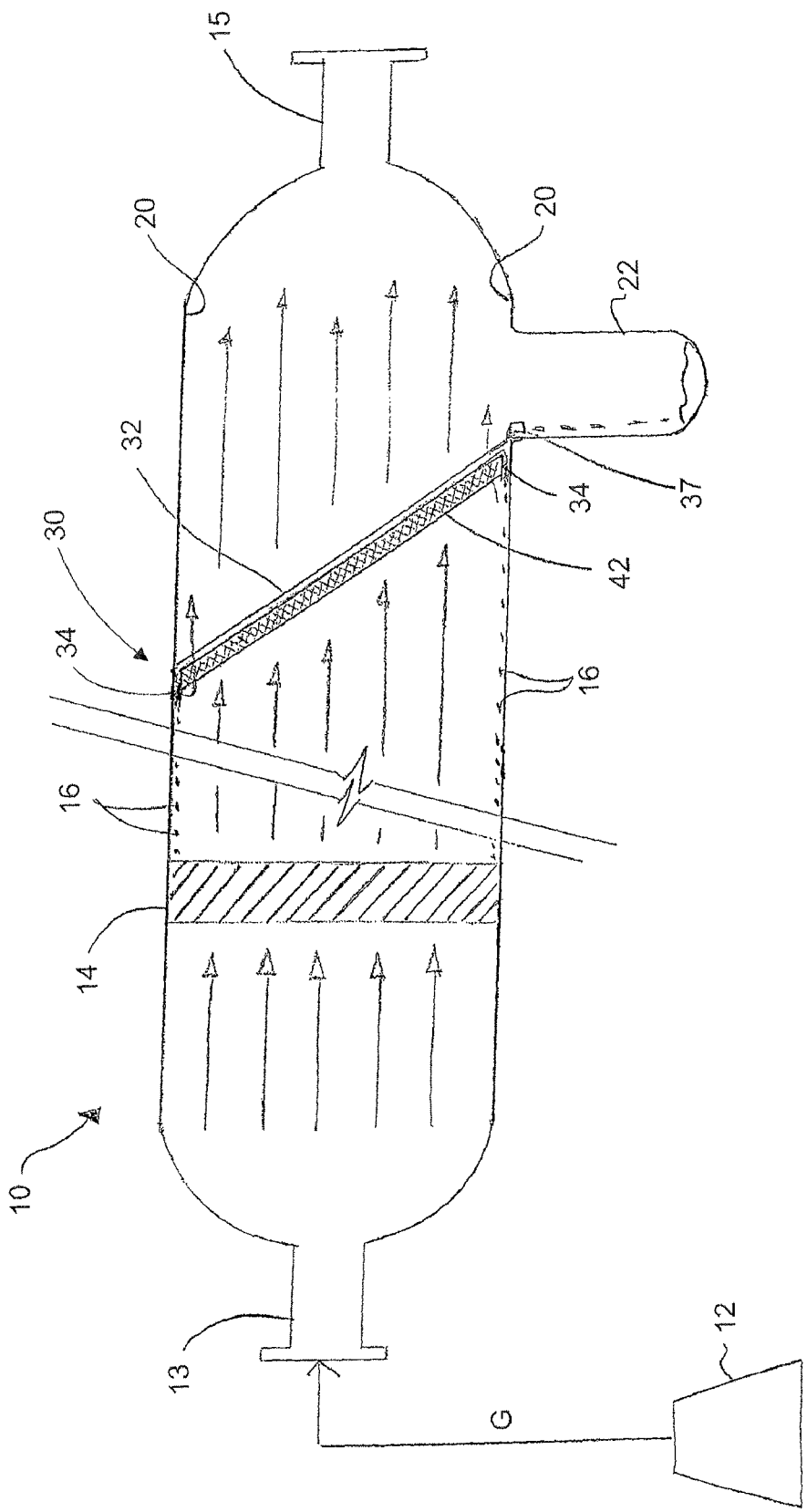
FIG. 3 is a longitudinal sectional view of a lube oil scrubber vessel having a collection apparatus according to FIG. 2 installed therein at a 45 degree angle relative to an inner wall of the vessel.
Figure 7:
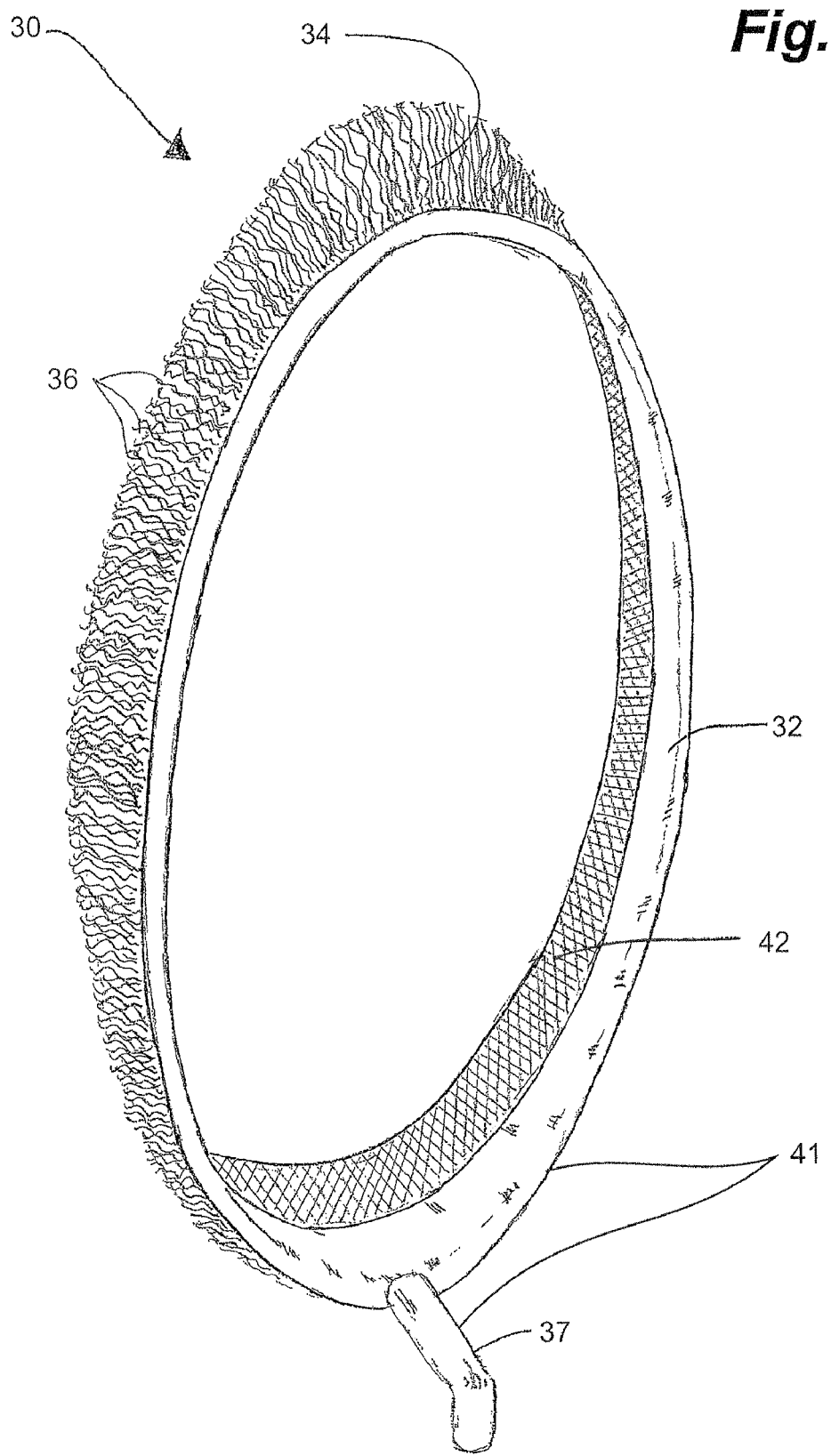
FIG. 7 is a perspective view of the collection apparatus of FIG. 3.

Having reference to FIGS. 2, 3 and 7 and in a second embodiment of the collection apparatus 30, an annular collector 41 comprises the annular channel 32 and the drainage port 37 at the bottom 38 of the annular channel 32. An annular arrangement of a plurality of filaments 34 are fluidly connected to and are retained in or supported by the annular channel and extend horizontally upstream therefrom in a direction opposite to the direction of the drainage port 37, and along the vessel's inner wall 20. A perforated material 42, such as an annular screen, is also retained in or supported by the annular channel 32 and sandwiches the filaments 34 against the inner wall 20 of the vessel 10. Coalesced droplets 16, which are carried along the inner wall 20, contact the filaments 34 while the gas flow G is permitted to continue to pass through the perforated material 42 to return to the main gas flow. Should pooling of the coalesced droplets 16 occur in the annular channel 32, the gas flow G exits the annular channel 32 through the perforated material 42 without the coalesced droplets 16 becoming re-entrained in the gas flow G.

The annular collector 41 can be mounted in the vessel 10 at a 90 degree angle relative to the inner wall 20 (FIG. 2) or can be mounted at an angle between about 45 degrees and 90 degrees relative to the wall. If the collection apparatus is designed to be mounted at an angle other than 90 degrees (FIG. 3), the filaments 34 and are angled so as to be parallel to the inner wall 20 when installed.

Preferably, the filaments 34 extend slightly beyond the annular ring 32 and the screen 41, typically about ¼ inch.

Preferably, the annular collector 41 is mounted having the drainage port 37 adjacent or extending into the collection area 22 so as to discharge the collected coalesced droplets 16 to the collection area 22.

In use, the separation vessel 10 typically has one or more conventional coalescing media, preferably demister pads 14, positioned downstream from the inlet 13 and preferably at about one diameter distance from the inlet 13. The inlet 13 may or may not have agglomerators (not shown) installed therein for providing an initial coalescing of mist to somewhat larger droplets. One or more collection apparatus 30 according to the embodiments disclosed herein may be installed downstream from the conventional demister pads 14.

As shown in FIG. 1, a transverse collector 31 of the collection apparatus 30, according to the first embodiment, is shown installed at the downstream face 35 of the demister pad 14.

As shown in FIGS. 2 and 3, an annular collector 41 of the collection apparatus 30 according to the second embodiment disclosed herein is installed adjacent the collection area 22, the drainage port 37 preferably extending therein. The collection apparatus 30 is preferably installed at about a 45 degrees angle relative to the inner wall 20. In a preferred embodiment the collection apparatus 30 is located at about 5 diameters distance from the inlet 13 of the vessel 10.

Figure 4:
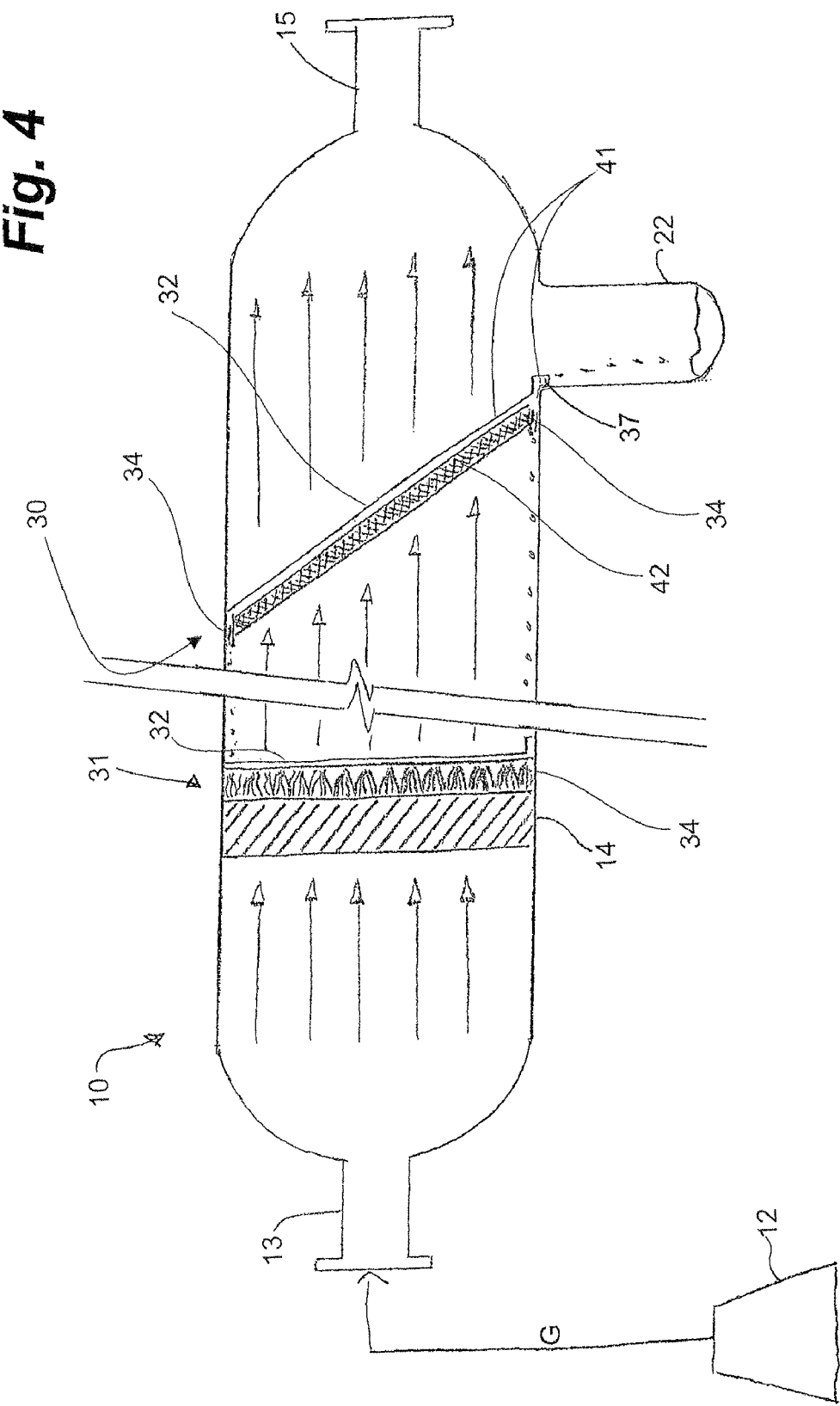
FIG. 4 is a longitudinal sectional view of a lube oil scrubber vessel having collection apparatus according to both FIGS. 1 and 3 installed therein, the collection apparatus being spaced from one another along a length of the vessel.

As shown in FIG. 4, a first transverse collector 31 according to the first embodiment is installed at the downstream face 35 of the demister pad 14 and a second collection apparatus 30, an annular collector 41, is installed adjacent the collection area 22 with the drainage port 37 preferably extending therein.

Use of one or more of the collection apparatus 30 disclosed herein permits K values, which represent the vapor load factor, to be in the range of 0.5 to about 5.0, which is up to about 10 times that in a conventional separator. Further, this permits use of separators which are approximately ⅓ the diameter of conventional vessels, thus decreasing the amount of materials required to build the vessels and the cost associated therewith.

The embodiments of the invention in which an exclusive property or privilege is claimed are defined as follows:

1. A collection apparatus for preventing re-entrainment of droplets coalesced from a horizontal gas flow, the collection apparatus positioned downstream of one or more thicknesses of coalescing material in a vessel containing the horizontal gas flow, the coalescing material forming coalesced droplets in the horizontal gas flow at least some of which flow along the inner wall, comprising:

an annular channel positioned adjacent an inner wall of the vessel;

an annular arrangement of a plurality of filaments fluidly connected to and supported by the annular channel the filaments extending horizontally upstream therefrom along the vessel's inner wall for engaging the coalesced droplets flowing along the inner wall and for directing the coalesced droplets to the annular channel;

while permitting passage of the gas flow horizontally through the vessel, leaving the coalesced droplets fluidly engaged with the plurality of filaments for directing horizontally therealong to the annular channel; and a port adjacent a bottom of the annular channel for gravity draining the coalesced droplets from the annular channel.

2. The collection apparatus of claim 1 wherein the plurality of filaments are supported by the annular channel further comprising:

a layer of a perforated material extending upstream from the annular channel for sandwiching the plurality of filaments between the layer of perforated material and the vessel's inner wall so as to intercept coalesced droplets flowing along the inner wall while permitting passage of the horizontal gas flow therethrough.

3. The collection apparatus of claim 2 wherein the perforated material is an annular screen.

4. The collection apparatus of claim 1 wherein the apparatus is adapted to be positioned between about 45 degrees to about 90 degrees relative to the vessel's inner wall, the port being positioned downstream toward a liquid collection area.

5. The collection apparatus of claim 4 wherein the plurality of filaments are angled relative to the annular channel as necessary so as to be adapted to be substantially parallel to the inner wall of the vessel.

6. The collection apparatus of claim 1 wherein the apparatus is adapted to be positioned in the horizontal gas flow having a vapor load factor of about 0.5 K to about 5.0 K.

7. The collection apparatus of claim 1 further comprising:

a plurality of secondary channels spanning transversely across the annular channel, the plurality of transverse channels supporting at least the plurality of filaments therein, the plurality of filaments forming an upstream face of tips, the secondary channels being fluidly connected to the annular channel.

8. The collection apparatus of claim 7 wherein the one or more thicknesses of coalescing material are one or more demister pads, the collection apparatus being adapted to be positioned substantially parallel to a downstream face of the demister pads, the upstream face of tips of the plurality of filaments substantially directly engaging the downstream face of the demister pads.

9. The collection apparatus of claim 8 wherein the upstream face of tips of the plurality of filaments substantially engage substantially all of the . downstream face of the demister pads, the filaments further acting to concentrate the droplets towards the annular channel.

10. The collection apparatus of claim 7 wherein the apparatus is adapted to be positioned in the horizontal gas flow having a vapor load factor of about 0.5 K to about 5.0 K.

11. The collection apparatus of claim 1 wherein the vessel is a lube oil scrubber fluidly connected downstream from a compressor.

12. A system for removal of mist from a gas flow through a horizontal vessel comprising:

one or more thicknesses of coalescing material spanning a diameter of the vessel and spaced downstream from a vessel inlet for coalescing droplets thereon, the coalesced droplets thereafter flowing toward an outlet end of the vessel at least some of which flow along an inner wall of the vessel;

a liquid collection area adjacent the outlet end of the vessel for collecting the coalesced droplets therein; and a first collection apparatus positioned downstream from the one or more thicknesses of coalescing material for directing the coalesced droplets to the liquid collection area, the first collection apparatus having:

an annular channel adapted to be positioned adjacent the inner wall of the vessel;

an annular arrangement of a plurality of filaments fluidly connected to and supported by the annular channel, the filaments extending horizontally upstream therefrom along the vessel's inner wall for engaging the coalesced droplets flowing along the inner wall and for directing the coalesced droplets to the annular channel while permitting passage of the gas flow horizontally through the vessel, leaving the coalesced droplets fluidly engaged with the plurality of filaments for directing horizontally therealong to the annular channel; and a port for gravity draining the coalesced droplets in the annular channel to the liquid collection area.

13. The system of claim 12 wherein the plurality of filaments of the first collection device are supported by the annular channel and the coalesced droplets are flowing along the inner wall, further comprising:

a layer of a perforated material extending upstream from the annular channel for sandwiching the plurality of filaments between the layer of perforated material and the vessel's inner wall so as to intercept coalesced droplets flowing along the inner wall while permitting passage of the horizontal gas flow therethrough.

14. The system of claim 13 wherein the perforated material is an annular screen.

15. The system of claim 12 wherein the apparatus is adapted to be positioned between about 45 degrees to about 90 degrees relative to the vessel's inner wall, the port being positioned downstream toward a liquid collection area.

16. The system of claim 15 wherein the plurality of filaments are angled relative to the annular channel as necessary so as to be adapted to be substantially parallel to the inner wall of the vessel.

17. The system of claim 12 wherein the apparatus is adapted to be positioned in the horizontal gas flow having a vapor load factor of about 0.5 K to about 5.0 K.

18. The system of claim 12 wherein the first collection device further comprises:

a plurality of secondary channels spanning transversely across the annular channel, the plurality of transverse channels supporting at least the plurality of filaments therein, the plurality of filaments forming an upstream face of tips, the secondary channels being fluidly connected to the annular channel.

19. The system of claim 18 wherein the one or more thicknesses of coalescing material are one or more demister pads, the collection apparatus being adapted to be positioned substantially parallel to a downstream face of the demister pads, the upstream face of tips of the plurality of filaments substantially directly engaging the downstream face of the demister pads.

20. The system of claim 19 wherein the upstream face of tips of the plurality of filaments substantially engages substantially all of the downstream face of the demister pads, the filaments further acting to concentrate the droplets towards the annular channel.

21. The system of claim 12 further comprising a second collection apparatus positioned downstream from the one or more demister pads for directing the coalesced droplets to the collection area, the collection apparatus having:

an annular channel adapted to be positioned adjacent an inner wall of the vessel;

a plurality of filaments fluidly connected to the annular channel for engaging the coalesced droplets for directing the coalesced droplets to the annular channel; and a port for gravity draining the coalesced droplets in the annular channel to the collection area.

22. The system of claim 21 wherein the first collection device further comprises:

a plurality of secondary channels spanning transversely across the annular channel, the plurality of transverse channels supporting at least the plurality of filaments therein, the secondary channels being fluidly connected to the annular channel; and wherein the plurality of filaments of the second collection device are supported by the annular channel and the coalesced droplets are flowing along the inner wall, further comprising:

an inner layer of a perforated material sandwiching the plurality of filaments between the inner layer and the vessel's inner wall so as intercept coalesced droplets while permitting passage of the gas flow therethrough.

23. The system of claim 22 wherein the one or more thicknesses of coalescing material are one or more demister pads, the collection apparatus being adapted to be positioned substantially parallel to a downstream face of the demister pads, the upstream face of tips of the plurality of filaments substantially directly engaging the downstream face of the demister pads.

24. The system of claim 21 wherein the plurality of filaments of the second collection device are supported by the annular channel and the coalesced droplets are flowing along the inner wall, further comprising:

an inner layer of a perforated material sandwiching the plurality of filaments between the inner layer and the vessel's inner wall so as intercept coalesced droplets while permitting passage of the gas flow therethrough.

25. The system of claim 24 wherein the perforated material is an annular screen.

26. The system of claim 21 wherein the apparatus is adapted to be positioned in the horizontal gas flow having a vapor load factor of about 0.5 K to about 5.0 K.

27. The system of claim 12 further comprising one or more thicknesses of coalescing material positioned in the vessel inlet so as to agglomerate the mist upstream from the one or more thicknesses of coalescing material in the vessel.

28. The system of claim 21 further comprising one or more thicknesses of coalescing material positioned in the vessel inlet so as to agglomerate the mist upstream from the one or more thicknesses of coalescing material in the vessel.

29. Collection apparatus for preventing re-entrainment of coalesced droplets in a horizontal gas flow, the collection apparatus adapted to be positioned downstream of one or more thicknesses of coalescing material in a vessel containing the horizontal gas flow, comprising:

an annular channel adapted to be positioned adjacent an inner wall of the Vessel;

a plurality of filaments fluidly connected to the annular channel for engaging the coalesced droplets for directing the coalesced droplets to the annular channel;

a plurality of secondary channels spanning transversely across the annular channel, the plurality of transverse channels supporting at least the plurality of filaments therein, the plurality of filaments forming an upstream face of tips, the secondary channels being fluidly connected to the annular channel; and a port adjacent a bottom of the annular channel for gravity draining the coalesced droplets from the annular channel.

30. The collection apparatus of claim 29 wherein the one or more thicknesses of coalescing material are one or more demister pads, the collection apparatus being adapted to be positioned substantially parallel to a downstream face of the demister pads, the upstream face of tips of the plurality of filaments substantially directly engaging the downstream face of the demister pads.

31. The collection apparatus of claim 30 wherein the upstream face of tips of the plurality of filaments substantially engage substantially all of the downstream face of the demister pads, the filaments further acting to concentrate the droplets towards the annular channel.

32. The collection apparatus of claim 29 wherein the apparatus is adapted to be positioned in the horizontal gas flow having a vapor load factor of about 0.5 K to about 5.0 K.

* * * * *